(12) United States Patent
Kodam et al.

(10) Patent No.: US 10,387,479 B2
(45) Date of Patent: Aug. 20, 2019

(54) AUGMENTED MOBILE MEDIA

(71) Applicant: EchoStar Technologies L.L.C., Englewood, CO (US)

(72) Inventors: Sheshank Kodam, Aurora, CO (US); Nicholas Brandon Newell, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 590 days.

(21) Appl. No.: 15/064,906

(22) Filed: Mar. 9, 2016

(65) Prior Publication Data
US 2017/0262458 A1  Sep. 14, 2017

(51) Int. Cl.
| G06F 16/435 | (2019.01) |
| H04L 29/06 | (2006.01) |
| G06F 16/48 | (2019.01) |
| G06F 16/958 | (2019.01) |

(52) U.S. Cl.
CPC ............ G06F 16/435 (2019.01); G06F 16/48 (2019.01); H04L 65/4084 (2013.01); *G06F 16/958* (2019.01)

(58) Field of Classification Search
CPC ......... G06F 17/30029; G06F 17/30038; G06F 17/30554; G06F 17/30867; G06F 17/30864; G06F 17/30696; G06F 3/0482; G06F 3/04842; G06F 16/435; G06F 16/48; G01C 21/26; H04L 65/4084

USPC ................. 707/722, 706, 999.003, 999.107; 701/430, 431, 45
See application file for complete search history.

(56) References Cited

U.S. PATENT DOCUMENTS

| 6,898,799 | B1 * | 5/2005 | Jarman | H04N 5/85 348/E7.054 |
| 2005/0134440 | A1 * | 6/2005 | Breed | B60N 2/2863 340/435 |
| 2007/0093958 | A1 * | 4/2007 | Jonsson | G01C 21/36 701/431 |
| 2008/0005676 | A1 * | 1/2008 | Evans | H04N 7/163 715/740 |
| 2008/0195664 | A1 * | 8/2008 | Maharajh | G06F 17/30035 |
| 2011/0258336 | A1 * | 10/2011 | Salomons | G06F 17/30017 709/231 |
| 2016/0025497 | A1 * | 1/2016 | Baalu | G01C 21/005 701/430 |
| 2016/0323348 | A1 * | 11/2016 | Bradbury | H04L 67/02 |
| 2017/0123421 | A1 * | 5/2017 | Kentley | G01C 21/26 |

* cited by examiner

*Primary Examiner* — Dung K Chau
(74) *Attorney, Agent, or Firm* — Bejin Bieneman PLC

(57) ABSTRACT

In an item of media content, one or more essential segments and one or more non-essential segments are identified. One or more essential segments is selected for inclusion in playback of the item of media content. At least one of the one or more non-essential segments is identified for inclusion in the playback according to at least one data about a vehicle environment and vehicle navigation. The item of media content is provided for playback.

20 Claims, 4 Drawing Sheets

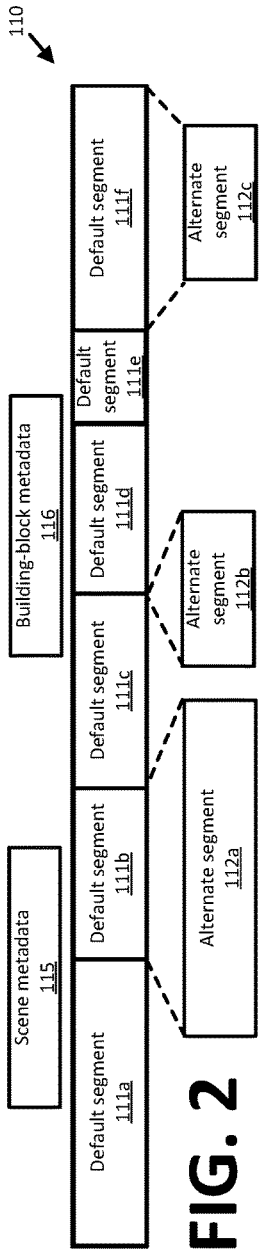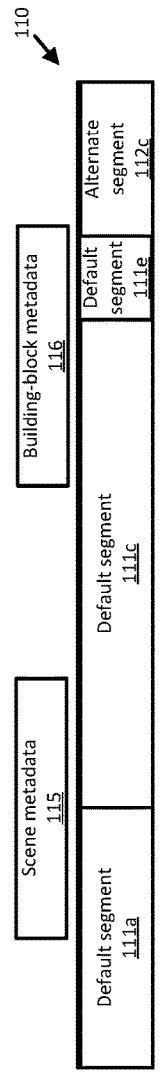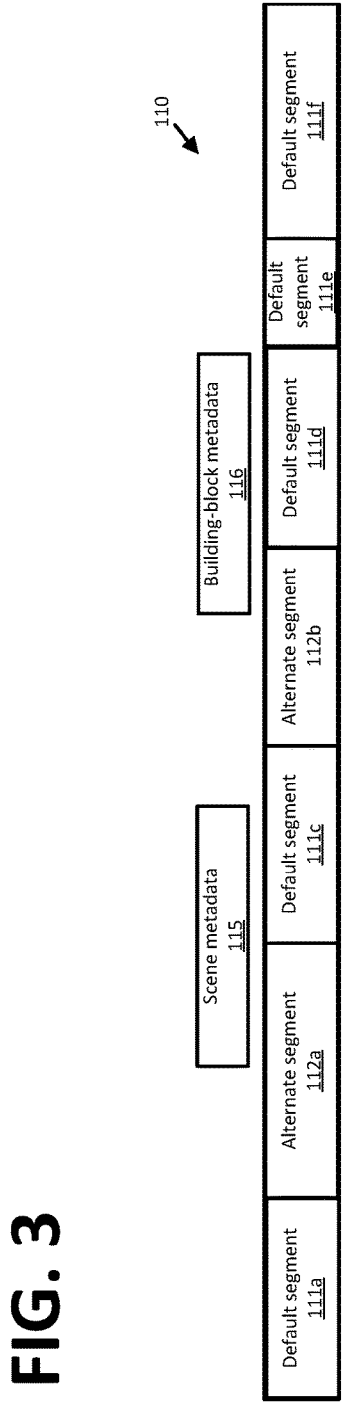
FIG. 2
FIG. 3
FIG. 4

AUGMENTED MOBILE MEDIA

BACKGROUND

High-speed networks are now widely available to users of devices such as mobile devices, e.g., smart phones, personal computers, and in-vehicle computers and/or media display systems. Such devices may be used to access and consume, e.g., view, media content in a mobile environment, e.g., in a vehicle such as a train or an automobile, or even while walking. For example, a user could view a frequently-watched television program, or a movie, etc., during a user's commute to and/or from work, school, etc. However, such media content is typically not adjusted to accommodate such mobile consumption, or if it is, the adjustment includes known mechanisms such as subtitles, increasing audio volume, adjusting a display aspect ratio, or some other mechanism to accommodate a particular user device.

DRAWINGS

FIGS. 2-4 are block diagrams of examples of media content.

DETAILED DESCRIPTION

System Overview

Figure 1:
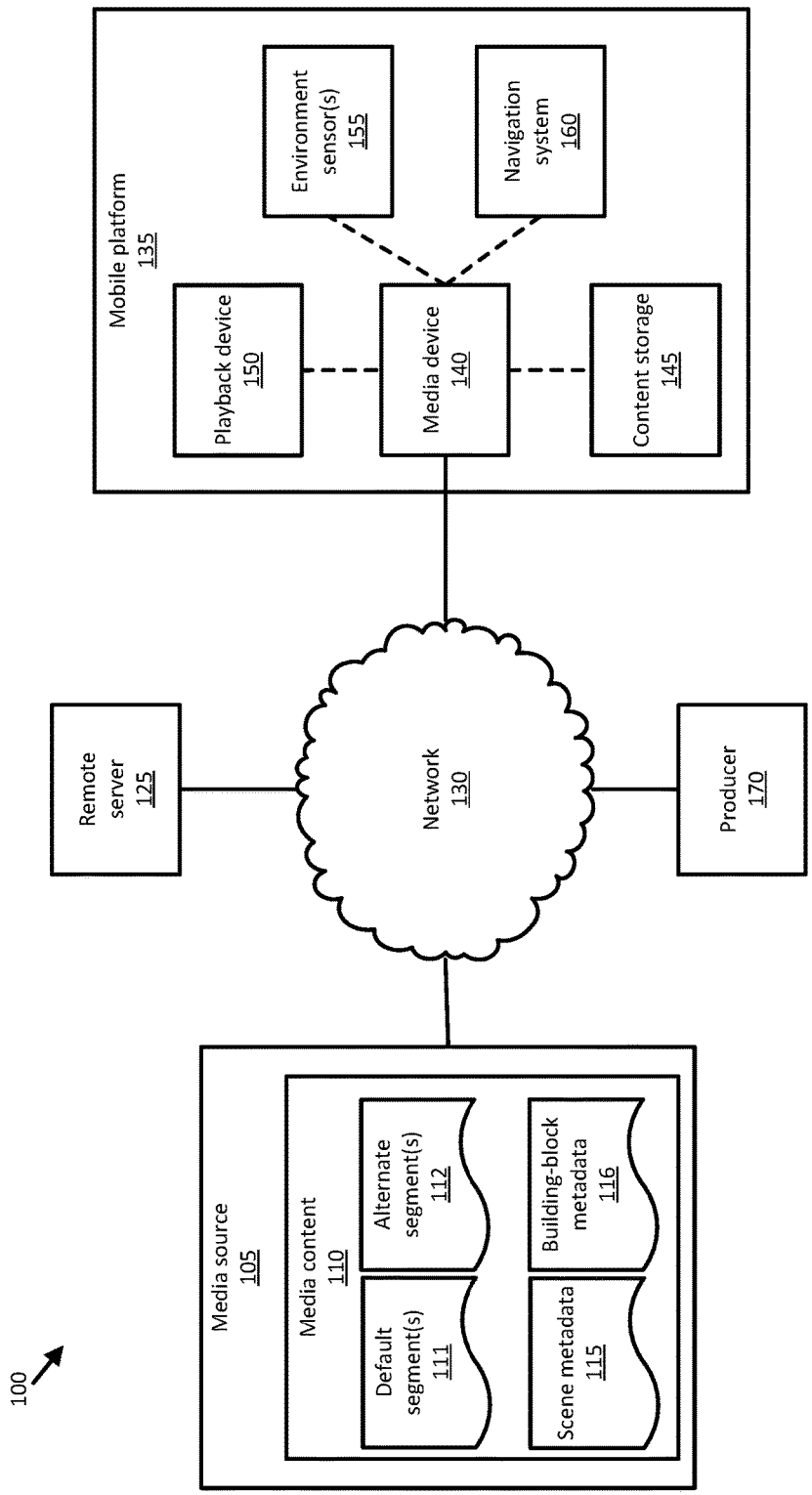
FIG. 1 is a block diagram of an exemplary media content delivery system.

FIG. 1 is a block diagram of an exemplary media content delivery system 100. Using certain elements of the system 100 as disclosed herein, in an exemplary implementation, a mobile digital media processing device 140 may receive media content 110. The media processing device 140 is typically included in a mobile platform 135, e.g., a vehicle such as a passenger car, van, etc. The media device 140 includes or is communicatively coupled to a playback device 150, which is a virtual reality device that can integrate playback of an item of media content 110 with surroundings of the mobile platform 135. For example, a user may request a favorite television program or the like, which is provided from a media source 105 to the media device 140 via a network 130. The media device 140 can store the content in a content storage 145 and/or provide the content 110 for playback by the device 150. Further, the media device 140 includes instructions, based on data from one or more of a remote server 125, one or more environment sensors 155, and/or a navigation system 160, to select segments 111, 112 of the media content 110 for playback along with virtual elements generated according to one or more real-world characteristics proximate to the mobile platform 135. In this way, playback of an item of media content 110 can include a virtual reality environment constructed according to real-world surroundings.

Exemplary System Elements

Media Source

In general, media source 105 may include multiple elements for processing, storing, and providing media content 110 and related data. Elements of the media source 105 may be local to one another and/or may be distributed amongst multiple locations. For example, media source 105 may include one or more computer servers (some or all of which may be referred to as "media servers") and data storage devices, e.g., for storing and processing content 110 and other data such as discussed herein.

In general, the media source 105 may be any one or some combination of various mechanisms for delivering media content 110, e.g., one or more computing devices and storage devices, and may depend on a type of media content 110 being provided. By way of example and not limitation, media content 110 data may be provided as video-on-demand through a cable, satellite, or internet protocol television (IPTV) distribution system, as streaming Internet video data, or as some other kind of data. Accordingly, the media source 105 may include one or more of a cable or satellite television head-end, a video streaming service that generally includes a multimedia web server (or some other computing device), or some other mechanism for delivering multimedia data. In general, examples of media content 110 include various types of data, including audio, video, images, etc.

Media content 110 is generally delivered via the network 130 in a digital format, e.g., as compressed audio and/or video data. The media content 110 generally includes, according to such digital format, media data 115 and media metadata 120. For example, MPEG refers to a set of standards generally promulgated by the International Standards Organization/International Electrical Commission Moving Picture Experts Group (MPEG). H. 264 refers to a standard promulgated by the International Telecommunications Union (ITU). Accordingly, by way of example and not limitation, media content 110 may be provided in a format such as the MPEG-1, MPEG-2 or the H.264/MPEG-4 Advanced Video Coding standards (AVC) (H.264 and MPEG-4 at present being consistent), or according to some other standard or standards. For example, media content 110 could be audio data formatted according to standards such as MPEG-2 Audio Layer III (MP3), Advanced Audio Coding (AAC), etc.

Further, the foregoing standards generally provide for including metadata in a file of media content 110, such as the media metadata discussed herein. As further discussed herein, metadata relevant to an item of media content 100 can be provided in a separate file accompanying digital media data, e.g., as scene metadata 115 and building-block metadata 116. For example, metadata 115, 116 could be provided in a predetermined format, e.g., according to an extensible markup language (XML) schema or the like, or some other predetermined format.

Media content 110 includes media content as it is usually provided for general distribution, e.g., a movie, entertainment program, etc., in a form has provided by a producer 170 of the media content 110 via a media source 105. Alternatively or additionally, media content 110 may be modified from the default (e.g., general distribution) form provided by the producer 170 of the content (e.g., recompressed, re-encoded, etc.). For example, the producer 170 could provide media content 110 default segments 111 for playback of an item of media content 110 in a general distribution or default format. However, the producer 170 could also provide alternate segments 112 to supplement and/or replace one or more default segments 111 and thereby modify the default format upon playback of the item of media content 110. In any case, media data 115 generally includes data by which a display, playback, representation, etc., of the media content 110 is presented by a media device 140, e.g., on a display device such a monitor, television set, etc. For example, media data 115 generally includes units of encoded and/or compressed video data, e.g., frames of an MPEG file or stream.

As mentioned above, media content 110 metadata may include metadata as provided by an encoding standard such as an MPEG standard. Alternatively and/or additionally, media content 110 metadata could be stored and/or provided separately to a media device 140, e.g., scene metadata 115 and/or building-block metadata 116. In general, media metadata included, e.g., in a stream of MPEG media data 110, provides general descriptive information for the media content 110. Examples of media metadata include information such as content 110 title, chapter, actor information, Motion Picture Association of America MPAA rating information, reviews, and other information that describes an item of media content 110. Information for metadata may be gathered from a content producer server 170. Further, media content 110 metadata can include, and/or can be supplemented by, scene metadata 115 and building-block metadata 116, described further below.

As mentioned above, an item of media content 110 can include default segments 111 and alternate segments 112. A "segment" of media content 110 as that term is used herein refers to a file or stream of digital media data, and/or a portion thereof, that can be combined with other segments to display of an item of media content 110. For example, a segment of media content 110, including segments 111, 112, can include a plurality of frames of digital media data. Further, a "segment" can be stored in a file by itself and/or can be included with other segments. Segments are generally include metadata providing indices, i.e., frame numbers, time indices, or the like, where the segment, e.g., a default segment 111, is located, or where the segment, e.g., an alternative segment 112, could be inserted, in the digital media data. Further, metadata 115, 116 can refer to segments 111, 112, e.g., to describe conditions under which a default segment 111 should be omitted from playback of an item of media content 110, under which an alternate segment should be inserted and/or should replace a default segment 111, etc.

A default segment 111 is, as the name implies, a set of digital media data included in display of an item of media content 110 by default. That is, the segment 111 will be played back by a media device 140 unless the media device 140 executes instructions to omit and/or replace the default segment 111. For example, a default segment 111 could be replaced by an alternate segment 112. Moreover, default segments 111 can be designated as essential or nonessential. An essential default segment 111 is one that, again as the name implies, is essential to playback of the item of media content 110, i.e., the item of media content 110 should not be played back without a default segment 111 or, as discussed below, without an alternate segment 112 replacing the essential default segment 111, assuming an alternate segment 112 is available. A nonessential default segment 111, on the other hand, could be omitted, e.g., to reduce playback time, to tailor playback, e.g., as described further herein, etc.

An alternate segment 112 is provided with media content 110 for insertion in a stream of the media content 110 played back by the media device 140, i.e., to replace a default segment 111, or as an addition to other segments 111, 112 being included in the playback.

As already mentioned, metadata may include other elements such as scene metadata 115 and building-block metadata 116. Scene metadata 115 includes data describing an environment and/or context of a scene included in a segment 111, 112. For example, scene metadata 115 could include a setting of a scene depicted in the segment 111, 112. Examples of scene settings included in metadata 115 include indoors, indoors in an office building, indoors in a home, indoors in the hospital, outdoors, on a city street, outdoors on a farm, outdoors in the mountains, outdoors on the plains, etc. Further, scene metadata 115 could include a level of lighting, e.g., cloudy, sunny, night, day, etc., as well as information about weather, e.g., Wendy, snowing, raining, etc. Yet further, scene metadata 115 typically includes a duration of a scene, i.e., typically a duration of a segment 111, 112. Even further, scene metadata 115 identifying a segment 111, 112 may indicate whether the segment is essential or nonessential to the item of media content 110 in which it is included.

Table 1 below provides an example of data that could be stored in a file of scene metadata 115 for an item of media content 110:

TABLE 1

| Segment ID | Start Index | End Index | Length | Scene Description |
|---|---|---|---|---|
| D000001E | 000000 | 000034 | 000034 | brightly__lit__indoor, hospital__OR |
| A000001E | 000000 | 000034 | 000034 | dimly__lit__indoor, hospital__OR |
| D000002 | 000035 | 000099 | 000064 | sunny__outdoor, subtropical, parking__lot |
| A000002 | 000035 | 000099 | 000103 | sunny__outdoor, subtropical, parking__lot |
| A000003 | 000035 | 000099 | 000032 | sunny__outdoor, subtropical, parking__lot |
| D000003E | 000100 | 000203 | 000103 | hospital__room, dimly__lit__indoor, crowded |
| A000005 | 000204 | 000204 | 000062 | hospital__room, dimly__lit__indoor, crowded |
| D000004 | 000204 | 000279 | 000075 | corridor, brightly__lit__indoor |
| ... | ... | ... | ... | ... |

As can be seen in Table 1, segments 111, 112 can be provided with identifiers that are unique within the context of an item of media content 110. Further, these identifiers can, e.g., by the prefix "capital D" or "A" can identify a segment 111, 112 as default and alternative segments, respectively. Further, default segments 111 can be designated as "essential," e.g., as indicated by the "E" appended to the identifiers for certain default segments. Moreover, an alternative segment 112 can be designated to likewise serve as an essential segment, as seen in the example above. In addition, essential segments 111, 112 are, in an exemplary implementation, required to be presented in an order indicated by respective start and end indexes of the segments 111, 112. Start and end indexes for each segment can be specified, as well as a length of a segment, e.g., in seconds, frames, etc. As can be seen, start and end indexes are usually specified in terms of indexes defined for the default version of an item of media content 110. Accordingly, regardless of the length of an alternative segment 112, a location for the segment 112 is specified, in this exemplary implementation, in terms of indexes in a default version of the media content 110 item.

Thus, as illustrated with the segment A000001, a segment 112 can be a same length as a segment D000001, whereupon the segment 112 can simply replace the segment 111. In addition, a segment 112, e.g., as seen with respect to the segment A000002, can be a different length than a default segment 111 that the segment 112 is provided to possibly replace. Yet further, as can be seen with the segment 112 having an identifier A000005, and alternative segment 112 can specify a same index as a start Index and an index for the segment 112, thereby indicating that the segment 112 can be inserted between two default segments 111. For example, a media device 140 could determine that one or both of the segments 111 identified as A000002 and A000005 should be inserted due to time duration to travel a route being greater than a time duration of a default version of the item of media content 110.

Further alternatively or additionally, Table 1 illustrates that scene metadata 115 typically includes a scene description e.g., one or more tags, short descriptive phrases, or the like. The media device 140 can use scene descriptions in combination with data from one or more environment sensors 155 and/or a vehicle navigation system 160, possibly in conjunction with weather data, map data, etc. from a remote server 125, to determine whether to include the fault and/or alternative segments 111, 112 in playback of an item of media content 110. For example, in addition to selecting segments 111, 112 based on an expected duration to traverse a route of a vehicle including the media device 140, the media device 140 could include programming to match scene descriptions in metadata 115 with data values from sensors 155, the navigation system 160, and/or a remote server 125. For example, if a scene description indicates "sunny_outdoor," and data about the weather, e.g., from the server 125 and/or sensor 155, indicates that is a very sunny day, then the media device 140 could implement a predetermined rule that a segment 111, 112 having the scene description of "sunny_outdoor" should be included in playback of the item of media content 110 based on the weather data value "sunny," possibly in conjunction with a consideration of other factors, such as a length of a segment 111, 112, other scene description information for the segment 111, 112 in the metadata 115, and/or information in building-block metadata 116.

Building-block metadata 116 identifies one or more virtual world building block elements included in a segment 111, 112 that can use real-world building blocks, i.e., physical structures near a media platform 135. A virtual building block is both an element in media data 110 that can be displayed to provide a user with a combined view of the virtual building block present in a segment 111, 112 and an actual physical element and/or structure present in surroundings of a media platform 135. Examples of building blocks include castles, bridges, horses, people, weather, waterfall, other vehicles, bodies of water. Building block metadata 116 can identify such virtual building blocks in terms of a coordinate system superimposed on frames of data in a segment 111, 112, e.g., in a known manner. Building block metadata 116 can also indicate times, e.g., according to media content 110 indices, i.e., indices in a segment 111, 112, when a building block is present in a segment 111, 112 and/or movement of a building block, e.g., where the building block is another vehicle.

Table 2 below provides an example of data that could be stored in a file of building-block metadata 116 for an item of media content 110:

TABLE 2

| Segment ID | Start Index | End Index | Building Block Coor. | Virt. Bldg. Block Descr. |
|---|---|---|---|---|
| D000001 | 000000 | 000034 | [set of pts. in 3D syst.] | bed |
| D000001 | 000000 | 000034 | [set of pts. in 3D syst.] | desk |
| A000001 | 000000 | 000034 | [set of pts. in 3D syst.] | bed |
| A000001 | 000000 | 000034 | [set of pts. in 3D syst.] | desk |
| D000002 | 000035 | 000099 | [set of pts. in 3D syst.] | parking_lot |
| A000002 | 000035 | 000099 | [set of pts. in 3D syst.] | parking_lot |
| A000003 | 000035 | 000099 | [set of pts. in 3D syst.] | parking_lot, ocean_view |
| D000003 | 000100 | 000203 | [set of pts. in 3D syst.] | hospital_room, ocean_view |
| A000005 | 000204 | 000204 | [set of pts. in 3D syst.] | ocean_view |
| D000004 | 000204 | 000279 | [set of pts. in 3D syst.] | corridor, mountain_view |
| ... | ... | ... | ... | ... |

As can be seen in Table 2, building block metadata 116 may identify segments according to identifiers and start and end indexes in a manner similar to that described above for scene metadata 115. Building block metadata 116 can also include a description of virtual building blocks, i.e., representations (e.g., moving images) of physical structures, that can be seen during playback of an item of media content 110. The 3-D coordinates shown to identify a building block are not represented in Table 2 for ease of illustration. However, it will be understood that a three-dimensional object, e.g., a building block, can be described according to a set of points, each point specified as a coordinate in the coordinate system, where the origin of the coordinate system is located with respect to a perspective of a wearer of a virtual reality media device 140.

Building block metadata 116 virtual building block descriptions can then be used by the media playback device 140 to identify real-world building blocks, e.g., according to map data from a remote server 125 and/or navigation system 160, that can be seen from a mobile platform during playback of an item of media content 110. For example, a scene in a segment 111, 112 could take place in a parking lot. If a mobile platform 135 was identified to be moving past a parking lot, a segment 111, 112 could be selected according to its inclusion of a parking lot, i.e., a virtual building block that can be supplemented when displayed by a real world building block, i.e., the virtual parking lot can be displayed in combination with the real world parking lot To facilitate placement of virtual building blocks with respect to real-world building blocks, a virtual building block described in the metadata 116, e.g., having a height, width, and length and/or other shapes or dimensions as specified by three-dimensional coordinates of a virtual world, as described above, could during playback of an item of media content 110, be assigned real-world coordinates, e.g., according to latitude and longitude, i.e. geo-coordinates, of the real-world building block being augmented with the virtual building block. For example, corresponding virtual and real-world building blocks could be placed on a "center of origin" on a geographic coordinate system (i.e., latitude/longitude). Likewise, the user's perspective, i.e., of a display of the term of media content 110, could be placed in the real-world coordinate system. Then, as a mobile platform 135 moved, a user perspective would change, i.e., because a user location in the real-world coordinate system would change. For example, if the item of media content 110 included, e.g., 30-60 frames per second, a user location could change as many as 30-60 times per second.

Remote Server

A remote server 125, e.g., one or more computing devices including respective processors and memories, may communicate via the network 130 with the media source 105 and/or a media device 140 included in a mobile platform 135. The remote server 125 may store various data that can be used to determine whether to include one or more default segments 111 and/or one or more alternate segments 112 in playback of an item of media content 110. For example, the server 125 can provide map data to the media device 140 indicating a route that a mobile platform 135, e.g., a vehicle, may take, along with real-world physical and/or structural elements on the route, i.e., real-world building block data 116. Such real-world physical or structural elements can be matched to building blocks in the virtual building block metadata 116 stored with an item of media content 110, and thereby included in a virtual world scene of the item of media content 110.

Further, the remote server 125, in addition to map data and data concerning a physical environment, can include other data that a media source 105 and/or media device 140 could use in determining segments 111, 112 to include in playback of media content 110, as well as building blocks in the segments 111, 112 to use for constructing a virtual reality as part of the playback of the media content 110. Yet further, the server 125 can provide traffic data such as is known. As used herein, "traffic data" can include data concerning a density of traffic, e.g., a number of vehicles passing a point for a specified period of time, and/or data concerning traffic light timing, e.g., cycles of red-green-yellow for a given traffic light, as is known. Moreover, as is known, traffic data can be used to determine a route for a vehicle and/or an anticipated duration to traverse a route. Weather and traffic data can be used to select segments 111, 112 for inclusion in playback of an item of media content 110 according to scene metadata 115 that indicates scene duration, scene environment such as weather, lighting, etc.

Network

Communications to and from the media source 105, one or more remote servers 125, a mobile platform 135, and one or more producer servers 170 may occur via the network 130. In general, the network 130 represents one or more mechanisms for delivering content 110 from the media source 105 to a media device 140. Accordingly, the network 130 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

Mobile Platform

Turning to the mobile platform 135, the media device 140 is generally a device including a computer processor and associated storage, e.g., volatile memory, nonvolatile memory, etc., and capable of communicating via the network 130. The media device 140 may include and/or may be connected to a virtual reality playback device 150. In general, the devices 140, 150, whether a single device or two devices operating together, will support known features such as receiving and storing digital media content 110, e.g., in a storage 145, typically wirelessly via the network 130.

The device 140 further typically conducts wireless communications via the network 130 to receive traffic data, whether data, map data, etc. from one or more remote servers 125. For example, the device 140 could query the server 125 to receive three-dimensional map data for a predetermined radius, e.g., 50 miles, around the mobile platform 135. Such three-dimensional map data could be used to indicate structures to be matched to building blocks identified in building block metadata 116.

As is known, a virtual reality playback device 150 may include a display screen, goggles, a helmet, or the like. For example, goggles or a helmet with lenses are known to allow virtual reality objects to be superimposed on a view of the real world.

An environment sensor 155 can include any sensor in a mobile platform 135, e.g., a vehicle, used to determine characteristics of an environment proximate to the mobile platform 135. For example, environment sensors 155 can include cameras or other sensors to detect conditions such as temperature, precipitation, presence or absence of pedestrians, other vehicles, etc.

A navigation system 160 is known in a vehicle or the like to determine a geolocation, e.g., according to latitude and longitude geo-coordinates, as well as to obtain map data, either stored in a device 140 or the like, or received from a server 125. The navigation system 160 accordingly can plan a route and predict a duration of travel on a route and/or various segments of a route.

Producer Servers

A producer server 170 provides items of media content 110 to the media source 105. By providing alternate segments 112 in addition to default segments 111, the producer 170 provides different versions of the item of media content 110, e.g., a television program, so that the item of media content 110 can be customized for playback by the media device 140. For example, an item of media content 110 can be provided to last different durations according to a user's anticipated time of travel wall playing back the item of media content 110. Further, alternate segments 112 can be provided to replace default segments 111 according to an environment, e.g., a default segment 111 may feature an outdoor environment in a rural setting, but an alternate segment 112 may provide a similar scene but in a city setting.

The producer server 170 typically provides scene metadata 115 and building block of metadata 116 along with the item of media content 110, as mentioned above. As also mentioned above, the scene metadata 115 can include starting and ending times of a scene, e.g., a segment 111, 112. Likewise, building block metadata 116 can indicate times and/or locations in media content of building blocks.

Media Content

FIG. 2 is a block diagram of an example item of media content 110. As seen in FIG. 2, an item of media content 110 may be provided with various default segments, e.g., the segments 111*a*-111*e*. Alternate segments 112*a*-112*c* are also provided. Metadata, e.g., indices specified in scene metadata 115, can indicate, for an alternate segment 112, a location in the item of media content 110 where the alternate segment 112 can be inserted. For example, as seen in FIG. 2, the alternate segment 112*a* could be inserted to replace the default segment 111*b*, the alternate segment 112*b* could be inserted between default segments 111*c*, 111*d*, and the alternate segment 112*c* could be inserted to replace the default segment 111*f*. Further, although not shown in FIG. 2, it is possible that an alternate segment 112 could be inserted within a default segment 111, rather than between first and second default segments 111. As also shown in FIG. 2 files of scene metadata 115 in building-block metadata 116 are generally included in or with an item of media content 110.

FIG. 3 is another block diagram of an example item of media content 110. In the example of FIG. 3, a default segment 111*b*, having been determined to be non-essential, has been omitted. For example, a media device 140 could have determined that a duration of travel time warranted a shorter version than a default version of an item of media content 110, resulting in the omission of the segment 111*b*. Further, an alternate segment 112*c* has replaced a default segment 111*f*. For example, the media device 140 could have determined that the alternate segment 112*c* included building blocks suitable for an expected outside environment of the mobile platform 135 and/or that the default segment 111*f* did not include such suitable building blocks. A determination that a segment 111, 112 includes suitable building blocks can include an identification of building blocks 116 in the segment 111, 112, e.g., as specified in building-block metadata 116. Identified building-blocks can then be compared to actual physical structures, e.g., as are identified in three-dimensional map data stored in the device 140 and/or obtained from a remote server 125.

FIG. 4 is a block diagram of yet another example item of media content 110. In this example, the alternate segment 112*a* has been inserted to replace the default segment 111*b*, the alternate segment 112*b* has been inserted between default segments 111 *c* and 111*d*, and the alternate segment 112 *c* has not been used, the item of media content 110 concluding with the default segment 111.

Exemplary Process Flows

Figure 5:
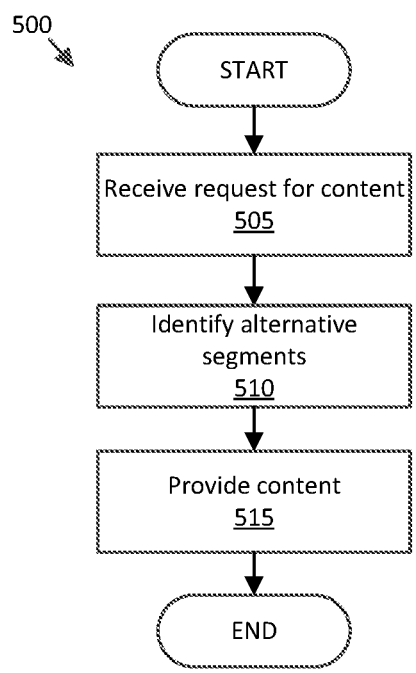
FIG. 5 is a diagram of an exemplary process for providing an item of media content.

FIG. 5 is a diagram of an exemplary process 500 for a media source 105 to provide an item of media content 110 to a media device 140. Process blocks of the process 500 could be carried out according to programming of one or more computers in the media source 105.

The process 500 begins in a block 505, in which the media source 105 receives a request for an item of media content 110 from a media device 140. The request could be received according to input of a user of the media device 140 and/or could be made by the media device 140 according to programming to make a request for an item of media content 110 at a predetermined time. Alternatively or additionally, the media source 105 could provide an item of media content 110, e.g., a television program or the like, upon availability of the item of media content 110, to a media device 140, which could store the item in content storage 145 until a time for playback Next, in a block 510, the media source 105 identifies the item of media content 110, including alternative segments 112 to a company default segments 111, as well as metadata files 115, 116, for delivery to the media source 140.

Next, in a block 515, the media source 105 transmits, e.g., via the network 130, the media content 110 item to the media source 140. Following the block 515, the process 500 ends.

Figure 6:
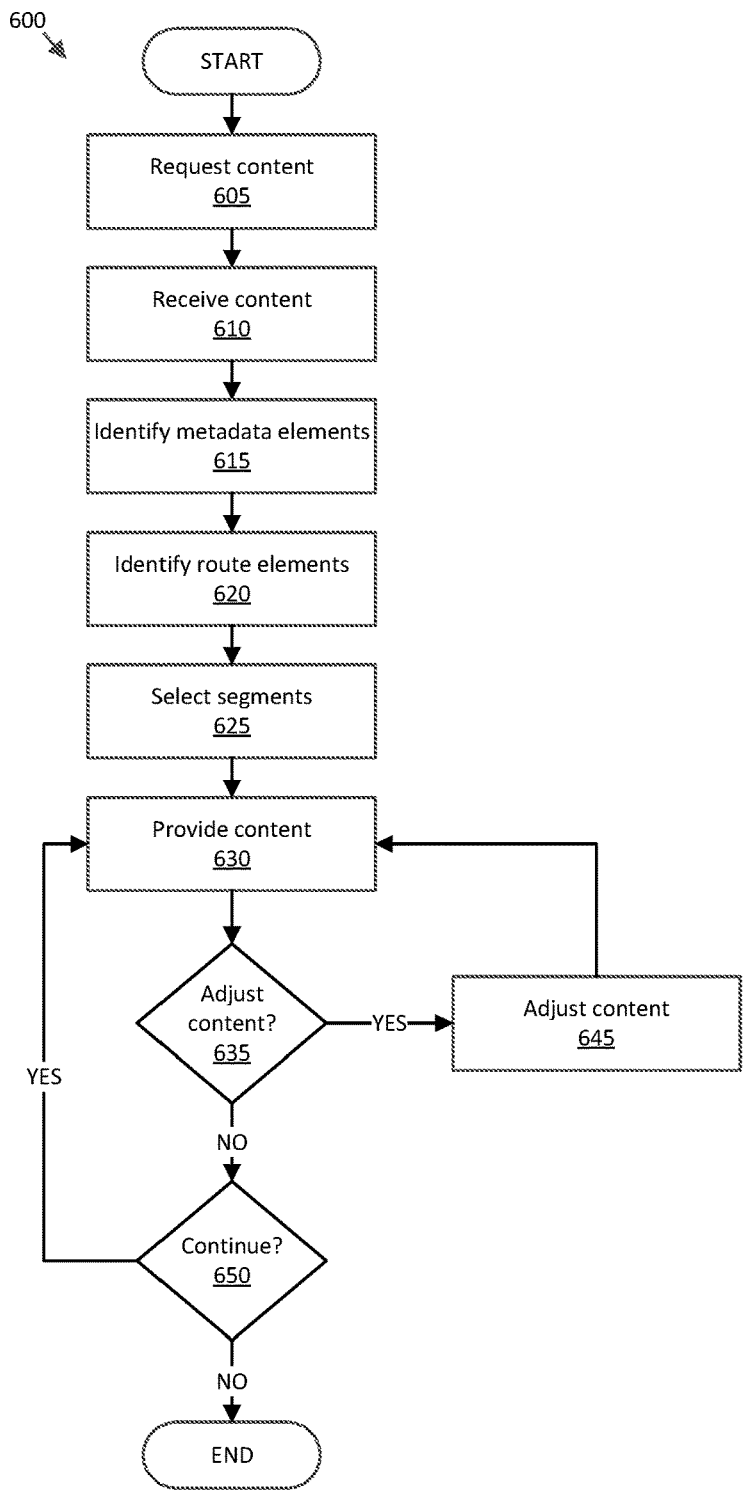
FIG. 6 is a diagram of an exemplary process for conducting playback of one or more portions of interest of an item of media content.

FIG. 6 is a diagram of an exemplary process 600 for conducting playback of one or more portions of interest of an item of media content. The process 600 may be performed according to program instructions stored in a media device 140 and/or other devices that may be included in a mobile platform 135 as described herein.

The process 600 begins in a block 605, in which a media device 140 requests an item of media content 110 from a media source 105, e.g., as described above with respect to the process 500.

Then, in a block 610, the media device 140 receives the requested item of media content 110, generally including segments 111, 112 as well as metadata 115, 116, as also described above. Further, the media device 140 could receive the requested item of media content 110 in response to a request, e.g., user input, to play back the item of media content 110. However, it is also possible that such request to play back the item of media content 110 could be received after the item of media content 110 has been downloaded to the device 140 and/or could be played back according to an instruction not based on user input, e.g., based on travel in a vehicle at a particular time of day, travel planned along a particular route with pre-known, e.g., stored, real world building blocks, etc.

Next, in a block 615, the media device 140 identifies scene descriptions and virtual building block descriptions in the received metadata 115, 116. For example, such descriptions could be provided as described above. The media device 140 could store and a memory identifiers for segments 111, 112, associated with respective scene and/or building block descriptions as indicated in the metadata 115, 116. Further, the media device 140 could identify a length, e.g., a period of time for playback, of each of the segments 111, 112. Yet further, for alternative segments 112, the media device 140 could identify whether the segment, if used, would replace a segment 111, and/or could be used in addition to a segment 111.

Next, in a block 620, the media device 140 obtains information about a route to be traversed, or being traversed, by a mobile platform 135, e.g., a passenger car, that could be relevant to playback of the requested item of media content 110. For example, as explained above, one or more environmental sensors 155 and/or in navigation system 160 could provide such information. Map data, which could be retrieved from the remote server 125, could indicate various real world building blocks along a planned route of travel. Environmental data, e.g., weather data, could indicate environmental conditions relevant to playback of an item of media content 110, e.g., presence or absence of daylight, sunshine, cloud cover, precipitation, fog, etc.

Next, in a block 625, the media device 140 selects segments 111, 112 for playback of the item of media content 110. As noted above, any default segment 111 designated as "essential" will be included in playback of the item of media content 111, unless an alternative segment 112 designated as "essential" is available to replace it. Once essential default segments 111 have been identified, then, for example, for each default segment 111, the media device 140 could determine a portion of a vehicle route to be traversed during playback of the segment 111. For instance, given traffic conditions identified in the block 620, and map data from a navigation system 160, the media device 140 could determine a duration of a route. Moreover, the media device 140 could determine, based on a duration of an item of media content 110 and the default segments 111 therein, predicted respective locations of a vehicle at respective start times of segments 111. The media device 140 could then, based on scene descriptors, available virtual building blocks and real world building blocks, and a predicted location at a time specified for playback of a default segment 111, whether to replace or supplement the default segment 111 with an alternative segment 112.

Other factors could be used in selecting segments 111, 112. For example, the media device 140 could store user preferences that could be compared to scene metadata 115 of a segment 111, 112. A user could, for instance, provide input stored in the media device 140 indicated preferences for attributes such as violence, language, etc., and/or a user age and/or other demographic data could be stored. Such data could be used to select a segment 111, 112 having more or less mature language, violence, etc., depending on stored user preferences and/or demographic data.

Yet further, the media device 140 could instruct the vehicle navigation system 160 to adjust a route based on selected segments. For example, a duration of travel could be lengthened or shortened to accommodate playback of an item of media content 110. Alternatively or additionally, a route could be selected for real-world building blocks available on a portion of the route that would allow for display of a virtual building block in an item of media content 110. Yet further, segments 11, 112 or an item of media content 110 could be planned for multiple trips, e.g., a break could be selected at a point where an item of media content 110 transitions from a first segment 111, 112 to a second segment 111, 112.

In selecting segments 111, 112 for playback, the media device 140 identifies essential segments, e.g., segments 111 designated as described above. The media device 140 first selects essential segments 111 for inclusion in playback of an item of media content 110. Note that, in one implementation, an order in which an essential segment 111 is presented could be adjusted, e.g., based on a vehicle route, sto align a real-world building block with a virtual building block. For example, when a route would include the real-world building block, the media device 140 could determine to play the essential segment 111 including a virtual world building block that can be used in an augmented reality with the real-world building block.

In any event, once essential segments 111 have been designated, the media device 140 identifies zero or more further segments 111, 112 for inclusion in the playback of the item of media content 110. For example, the media device 140 may include no further segments 111, 112 behind the essential segments 111, 112 if travel time of a vehicle including the media device 140 does not permit, if such segments 111, 112 are not selected based on a planned route of travel, weather conditions, etc. On the other hand, the media device 140 may include one or more further non-essential segments 111, 112 where the travel time permits, based on traffic conditions, weather conditions, identification of suitability based on scene and/or building block metadata 115, 116, etc.

Next, in a block 630, the media device 140 provides playback of the item of media content 110 according to segments 111, 112 selected as described in the block 625. Further, media device 140 may combine virtual building blocks with real world building blocks to enhance a user experience of the item of media content 110, and to allow the item of media content 110 to be consumed in a manner that is enhanced by surroundings of a mobile platform 135. Further, much like segments 111, 112 could be designated as essential or non-essential, scene metadata 115 could indicate whether a virtual building block in a segment 111, 112 was essential or non-essential, i.e., could be omitted from a display of the segment 111, 112.

Next, in a block 635, the media device 110 determines whether to make adjustments to playback of the item of media content 110. For example, a vehicle route may be taking more or less time to traverse than predicted, weather conditions could change, a route could be changed, etc. Accordingly, in a manner as described above, the media device 140 may compare map data, environmental data, etc. to information and metadata 115, 116 for an anticipated remainder of a vehicle route. The media device 140 may then determine to add and/or remove non-essential segments 111, 110. If adjustments are to be made, then the process 600 proceeds to a block 645. If no adjustments are to be made, then the process 600 proceeds to a block 650.

In the block 645, the media device 140 makes specified adjustments to playback of the item of media content 110, e.g., selects segments 111 and/or 112 for a remainder of playback of the item of media content 110 different than selected in the block 625. Such selection may be made according to determination and evaluation of data as described in the block 635. Following the block 645, the process 600 returns to the block 630.

In the block 650, the media device 140 determines whether the process 600 is to continue. For example, playback of an item of media content 110 could be ended, e.g., because a vehicle has reached its destination, because they last segment 111, 112 has been reached, etc. If playback is to continue, then the process 600 returns to the block 630. Otherwise, the process 600 ends.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A media device that includes a processor and a memory, the memory storing instructions executable by the processor to:
    identify, in an item of media content, one or more first segments that are essential to playback of the item of media content, and one or more second segments that are not essential to playback of the item of media content, whereby the first segments are essential segments and the second segments are non-essential segments;
    select the one or more essential segments for inclusion in playback of the item of media content;
    identify alternative content for inclusion in the playback of at least one of the one or more non-essential segments according to at least one data about a vehicle environment and vehicle navigation;
    replace default content in the at least one of the one or more non-essential segments with the alternative content; and
    provide playback of the item of media content including the alternative content.

2. The device of claim 1, the instructions further comprising instructions to, after beginning to provide playback of the item of media content, update at least one of the environment data and the navigation data, and based on the updated data, determine whether to perform at least one of including a non-essential segment that was not identified to be included in playback of the item of media content and excluding a non-essential segment that was identified to be included in the playback of the item of media content.

3. The device of claim 1, the instructions further comprising instructions to identify at least one scene descriptor in a non-essential segment, and to select the non-essential segments for inclusion in the playback according to a comparison of the at least one scene descriptor to at least one of the environment data and the navigation data.

4. The device of claim 1, the instructions further comprising instructions to identify at least one representation of a physical element in a non-essential segment, and select the non-essential segment for inclusion in the playback according to a comparison of the representation of the physical element and a real-world physical element described in at least one of the vehicle environment and the vehicle navigation data.

5. The device of claim 1, wherein the vehicle navigation data includes historical data about one or more routes traversed by a vehicle.

6. The device of claim 1, the instructions further comprising instructions to select at least one of the one or more non-essential segments according to an expected duration of a vehicle route.

7. The device of claim 1, the instructions further comprising instructions to select the essential segments for playback in a specified order.

8. The device of claim 1, wherein the data about the vehicle environment includes at least one of weather data and a time of day.

9. The device of claim 1, wherein the navigation data includes at least one of map data and traffic data retrieved from a remote server.

10. The device of claim 9, the instructions further comprising instructions to select a real-world structure from the map data for use with a virtual building block in the item of media content.

11. A method, comprising:
    identifying, in an item of media content, one or more first segments that are essential to playback of the item of media content, and one or more second segments that are not essential to playback of the item of media content, whereby the first segments are essential segments and the second segments are non-essential segments;
    selecting the one or more essential segments for inclusion in playback of the item of media content;
    identifying alternative content for inclusion in the playback of at least one of the one or more non-essential segments according to at least one data about a vehicle environment and vehicle navigation;
    replacing default content in the at least one of the one or more non-essential segments with the alternative content; and
    providing playback of the item of media content including the alternative content.

12. The method of claim 11, further comprising updating at least one of the environment data and the navigation data, and based on the updated data, determining whether to perform at least one of including a non-essential segment that was not identified to be included in playback of the item of media content and excluding a non-essential segment that was identified to be included in the playback of the item of media content.

13. The method of claim 11, further comprising identifying at least one scene descriptor in a non-essential segment, and selecting the non-essential segments for inclusion in the playback according to a comparison of the at least one scene descriptor to at least one of the environment data and the navigation data.

14. The method of claim 11, further comprising identifying at least one representation of a physical element in a non-essential segment, and selecting the non-essential segment for inclusion in the playback according to a comparison of the representation of the physical element and a real-world physical element described in at least one of the vehicle environment and the vehicle navigation data.

15. The method of claim 11, wherein the vehicle navigation data includes historical data about one or more routes traversed by a vehicle.

16. The method of claim 11, further comprising selecting at least one of the one or more non-essential segments according to an expected duration of a vehicle route.

17. The method of claim 11, further comprising selecting the essential segments for playback in a specified order.

18. The method of claim 11, wherein the data about the vehicle environment includes at least one of weather data and a time of day.

19. The method of claim 11, wherein the navigation data includes at least one of map data and traffic data retrieved from a remote server.

20. The method of claim 19, further comprising selecting a real-world structure from the map data for use with a virtual building block in the item of media content.

\* \* \* \* \*